United States Patent [19]

Rankin, III

[11] Patent Number: 4,678,131
[45] Date of Patent: Jul. 7, 1987

[54] HIGHLY ABRASIVE RESISTANT MATERIAL

[75] Inventor: Arthur L. Rankin, III, Signal Mtn., Tenn.

[73] Assignee: Combustion Engineering, Inc., Windsor, Conn.

[21] Appl. No.: 822,095

[22] Filed: Jan. 24, 1986

Related U.S. Application Data

[62] Division of Ser. No. 703,160, Feb. 19, 1985, Pat. No. 4,604,781.

[51] Int. Cl.$^4$ ............................................. B02C 4/30
[52] U.S. Cl. .................... 241/293; 29/132; 241/300
[58] Field of Search ............... 29/132; 241/107–133, 241/293, 294, 298, 300

[56] References Cited
FOREIGN PATENT DOCUMENTS 158906  8/1985  Japan .................................. 29/132
8200976  7/1919  PCT Int'l Appl. .
2072702  3/1980  United Kingdom .

Primary Examiner—Timothy V. Eley
Attorney, Agent, or Firm—Arthur E. Fournier, Jr.

[57] ABSTRACT

An alloy characterized by its highly abrasive resistant qualities which render it particularly suitable for use as the material from which to fabricate the external surface of a grinding, i.e., pulverizer, roll (18) of the type that is designed to be employed in a bowl mill (10) so as to be operative therein for purposes of effecting the pulverization of a material such as coal through the coaction of the grinding roll (18) with another surface (14) with which the bowl mill (10) is provided for this purpose. The subject alloy which is capable of being cast or applied to the grinding roll (18) in the form of a weld overlay comprises, by weight percentages, 4.0–6.0% Carbon; 3.0–14.0% Manganese; 1.0–2.5% Silicon; 15.0–30.0% Chromium; and 4.0–6.0% Molybdenum; with 0.5–2.0% Boron being added thereto, the balance being iron and incidental impurities.

3 Claims, 2 Drawing Figures

HIGHLY ABRASIVE RESISTANT MATERIAL

This is a divison of application Ser. No. 703,160 filed Feb. 19, 1985, now U.S. Pat. No. 4,604,781.

BACKGROUND OF THE INVENTION

This invention relates to alloy materials, and more specifically to an alloy which is highly abrasive resistant.

An essential component of any steam generation system of the type, which utilizes pulverized coal as a fuel, is the apparatus in which the coal is pulverized so as to render it suitable for such usage. One form of apparatus in particular, which has frequently been used for this purpose, is that commonly referred to as a bowl mill by those in the industry. Two of the essential components of such a bowl mill are the body portion, i.e., housing, within which a grinding table is mounted for rotation, and the plurality of grinding rolls that are supported in equally spaced relation one to another in a manner so as to coact with the grinding table such that the coal disposed on the surface of the grinding table is capable of being ground, i.e., pulverized, by the rolls. For this purpose, the grinding rolls are each designed to be mounted on a shaft-like member whereby the grinding rolls are capable of movement relative to the surface of the grinding table. Accordingly, in order to effect the assembly of the grinding roll with the aforesaid shaft-like member, the former preferably has a through passage provided through the center thereof. This through passage enables the shaft-like member to be positioned therewithin in mounted relation thereto. Therefore, in order to facilitate the task of providing the grinding roll with such a through passage, it is desirable that the grinding roll be made of a material that is characterized by its ease of machinability, i.e., a relatively soft material such as ductile iron.

In contradistinction to the desirability of making the grinding roll from a relatively soft material, there also exists a requirement that at least the external, i.e., outer, surface of the grinding roll be of a material characterized by good wear-resistant qualities. The reason for this is that in the course of effecting the pulverization of material with these grinding rolls, the latter are of necessity subjected to a harsh abrasive action by virtue of the nature of the material being pulverized as well as by virtue of the manner in which the pulverization takes place. The result, therefore, is that the grinding rolls are susceptible to being rendered unusable because of excessive wear in a relatively short period of time, i.e., the rolls are found to have a relatively short operating life. Obviously, such a result is to be avoided, if possible. In this context, it should be noted that the wear which grinding rolls employed in bowl mills actually experience is influenced principally by the grinding characteristics of the material being pulverized as well as by the productive output of the bowl mill, i.e., the volume of material that is being pulverized within the bowl mill in a given period of time.

When the external surface of the pulverizer, i.e., grinding, roll becomes sufficiently worn to preclude any further use thereof for purposes of effecting the pulverization of material therewith, the remaining portions of the roll are normally still functional. That is, but for its worn external surface, the grinding roll would still be capable of being used. Thus, from the standpoint of achieving economies of manufacture, it would be desirable, if possible, to effect a resurfacing of the external surface of the grinding roll such that the latter might once again be utilized for purposes of pulverizing material rather than to have to replace the worn grinding roll with a totally new grinding roll. In this regard, one would normally expect that the cost of reconditioning, i.e., resurfacing, the external surface of a worn grinding roll would be significantly less costly than manufacturing a totally new grinding roll.

Apart from the relative cost of resurfacing the external surface of a worn grinding roll vis-a-vis that of manufacturing a totally new grinding roll, there is also the matter of the operating life achievable with a resurfaced worn grinding roll as contrasted to that obtainable with a new grinding roll. That is, in order to be economically feasible, it is desirable that the operating life of a resurfaced worn grinding roll be approximately equivalent to or greater than that which one would expect from a new grinding roll. Namely, any savings achievable from utilizing a resurfaced worn grinding roll as opposed to employing a new grinding roll should not be dissipated by virtue of the fact that the operating life of the former is such that several resurfacings thereof would be required in order to achieve an operating life with the worn grinding roll, which is commensurate with that obtainable from the use of a totally new grinding roll. In summary, if in the interest of obtaining comparable operating lives, multiple resurfacings of the worn grinding roll would be required, the cost thereof would probably equal or exceed the cost of manufacturing a totally new grinding roll whereby the advantages accruing from reusing a worn grinding roll vis-a-vis replacing the latter with a new grinding roll would not be realized.

Thus, it is not surprising to find in the prior art evidence of the fact that various efforts have heretofore been undertaken directed towards achieving improvements in the wear life of pulverizer rolls. For ease of reference, it is possible to classify these efforts into three basic categories. First, there are those efforts which have been directed towards realizing improvements in the manner in which the original manufacture of the pulverizer rolls is accomplished and/or in the manner in which the pulverizer rolls are resurfaced after having become worn. Secondly, there are those efforts which have been directed towards producing an improved nickel-chromium alloy that is capable of being utilized for purposes of fabricating at a minimum therefrom the external, i.e., wear, surface of the pulverizer rolls. Thirdly, there are those efforts which have been directed towards producing an improved high chromium alloy that is capable of being utilized for purposes of fabricating at a minimum therefrom the external, i.e., wear, surface of the pulverizer rolls.

Commencing with a consideration of the first category enumerated above of those efforts that have been undertaken in an effort to improve the wear life of pulverizer rolls, reference may be had in this regard, by way of exemplification and not limitation, to U.S. Pat. No. 4,389,767, which issued on June 28, 1983, and which is assigned to the same assignee as the present application. U.S. Pat. No. 4,389,767 discloses a method of manufacturing a pulverizer roll which is characterized in that the external, i.e., wear, surface of the pulverizer roll is shaped in accordance with the predicted wear characteristics that the pulverizer roll is expected to experience based on the nature of the use to which the pulverizer roll is intended to be put such that the contour thereof replicates that of a worn pulverizer roll, and a substantially uniform layer of a material characterized by its wear-resistant qualities is applied to the external surface of the pulverizer roll so as to form the wear surface of the pulverizer roll.

A further exemplification of those prior art efforts that are deemed to be classifiable in the first category enumerated above is that which can be found set forth in U.S. patent application Ser. No. 446,850. The latter U.S. patent application bears a filing date of Dec. 6, 1982, and is assigned to the same assignee as the present application. The subject matter of U.S. patent application, Ser. No. 446,850 is directed to a pulverizer roll embodying a trimetal form of construction and wherein the core material, i.e., the first or inner layer, of the trimetal roll consists of a relatively soft material that is noted for its good machinability, the next, i.e., second or intermediate, layer of the trimetal roll comprises a material that has medium wear-resistant qualities and the last, i.e., third or outer, layer of the trimetal roll comprises a material having highly abrasive resistant qualities.

Moving on to a consideration of the second category of prior art efforts to which mention has been made hereinbefore, reference may be had for this purpose, by way of exemplification and not limitation, to U.K. Patent Application GB2,027,702A. To those skilled in this art, it has long been known to fabricate the external, i.e., wear, surface of pulverizer rolls from that material commonly referred to as Nihard. U.K. Patent Application GB2,027,702A, on the other hand, is directed to a white cast iron alloy, which the assignee of this application, i.e., Sheepbridge Equipment Limited of the United Kingdom, has seen fit to refer to as "Premium Nihard". Allegedly, the latter alloy has better wear-resistant qualities than that of what will for want of a better designation be referred to herein henceforth as ordinary Nihard, i.e., that material which those skilled in this art have long referred to as Nihard. As set forth in U.K. Patent Application GB2,027,702A, the white cast iron alloy, i.e., Premium Nihard, to which this patent application is directed comprises, by weight, 2.8%–3.5% Carbon, 0.6%–2.0% Silicon, 0.05%–0.5% Manganese, 0.05%–0.25% Sulfur, 0.5%–1.5% Phosphorous, 3.5%–5.0% Nickel, 2.5%–4.5% Chromium, 0.2%–0.7% Molybdenum, and with the balance being iron and incidental impurities. Further, it is stated in U.K. Patent Application GB2,027,702A that the white cast iron alloy, which comprises the subject matter thereof, may also contain up to 0.01% Bismuth, by weight, to ensure against possible graphite formation particularly in heavy section castings.

The third category of prior art efforts to which mention has been made hereinbefore will next be considered. With respect thereto, the material, which is known as "Stoody 103", may be viewed as representing the culmination of one such effort. This material, i.e., Stoody 103, is known to be commercially available from The Stoody Company of California. Insofar as concerns the composition of the Stoody 103 material, the latter is reported to include, among others, the following elements in the approximate amounts, by weight, listed: Carbon-4.0%, Manganese-5.0% and Chromium-27.0% to 28.0%. On the other hand, Stoody 103 material is said not to include either Molybdenum or Boron, except perhaps in barely discernible quantities. In the context of pulverizer rolls, Stoody 103 material is commonly employed as a weld overlay material that is applied to the outer surface of the pulverizer roll whereby the Stoody 103 material forms the external, i.e., wear, surface of the pulverizer roll. It has been alleged that the wear-resistant qualities of Stoody 103 material are better, by a factor of 1½ to 2 times, than those of the material which has been referred to herein as ordinary Nihard.

Another example of an effort which is deemed to be classifiable into the third category, as the categories have been defined hereinbefore, of efforts that have been undertaken in the prior art is that which resulted in the development of the material, which forms the subject matter of the International Patent Application which bears the Application No. PCT/US82/00976. The latter International Patent Application is directed to an abrasive resistant white cast iron. More specifically, the white cast iron which forms the subject matter of the aforereferenced International Patent Application is defined therein as comprising a base of iron, and, by weight, 2.0% to 4.5% Carbon, 0.001% to 4% Boron and one or more of the following alloying elements: 0.001% to 30% Vanadium, Titanium, Niobium, Tantalum, Molybdenum, Nickel, Copper or Chromium, or mixtures thereof.

Continuing, it has been known in the prior art to resurface a worn grinding roll. Moreover, it is known that when the resurfacing of a worn grinding roll has taken place, this resurfacing has frequently taken the form of providing the exterior surface of the worn grinding roll with a suitably dimensioned layer of weld material. The results with some notable exceptions obtainable from the hardfacing of a grinding roll have, generally speaking, been of a satisfactory nature.

One of these exceptions has been noted in connection with the use of one particular technique for purposes of accomplishing the resurfacing of a worn grinding roll. The technique to which reference is had here is that of bulk welding. The technique of bulk welding is a technique whereby, as those skilled in this art know, a wire, flux and a bulk metal powder are utilized in a submerged arc welding process. More specifically, in accordance with the technique of bulk welding, the bulk metal powder is fed at a controlled rate onto the base metal, the flux is piled on top of the powder, and the wire is welded through the combination melting of the powder and the flux. Note is taken here of the fact that the powder may function to alloy the weld or to just increase the deposition rate.

In order to achieve a proper weld, it is important, however, that the bulk metal powder, which is being utilized in connection with the resurfacing of the worn grinding roll, be uniform and non-segregative. If it is not, a faulty weld can be produced. To this end, one of the critical constituents in hardfacing a worn grinding roll is the carbon content. Moreover, it is known that the carbon content required for use in such applications is very fine and light, and as such tends to float on top of the other powders that are utilized in the bulk welding process. On the other hand, if the graphite is permitted to float on top of these other powders, this can give rise to an inconsistent alloy being produced, which for obvious reasons is something which is to be avoided. In addition, because of its fineness graphite has in the past demonstrated a tendency to cause the feeding device to become plugged. Further, this pluggage of the feeding device has been found to occur as a result of a bridging action on the part of the fine graphite.

One way of obviating the problem of nonuniformity of the powders, when employing the technique of bulk welding for purposes of accomplishing the resurfacing of a worn grinding roll, is to pelletize the powders whereby all of the constituents thereof are combined homogeneously into pellets. Such a pelletizing process requires the addition of a binder as well as the performance of the steps of mixing to pelletize and baking to set the binder. Some of the advantages that accrue from the use of such a pelletizing process is that there is provided a uniform screen size powder with no fines, and each pellet has essentially the same composition. In addition, such a pelletizing process is also known to permit greater flexibility in alloy composition by thus enabling different formulations of a homogeneous powder to be developed.

Another exception to the general rule that hardfacing a grinding roll produces acceptable results is when the hardfacing is attempted to be applied to certain forms of new grinding rolls. In view of the generally satisfactory experience which the prior art has had with the resurfacing of a worn grinding roll, attempts have been made to provide the exterior surface of new grinding rolls with hardfacing. Unfortunately, such attempts at hardfacing the exterior surface of a grinding roll when applied to certain forms of new grinding rolls as opposed to worn grinding rolls have not heretodate met with a great deal of success.

The impetus behind these attempts at hardfacing the exterior surface of new grinding rolls resides largely in the desire to effectively extend the operating life of new grinding rolls. A major reason why the attainment of a longer operating life for new grinding rolls is sought is that it would enable one to extend the point in time at which it becomes necessary to shut down the bowl mill for purposes of enabling the removal therefrom of the worn grinding roll and the replacement thereof with an unworn grinding roll. In this regard, it is important to note that a plurality of bowl mills are commonly employed to provide the required amount of pulverized coal to a coal-fired steam generator, and that each of these bowl mills normally embodies three grinding rolls that are each susceptible to having to be removed and replaced as they become worn. Also, there is the matter of the time and effort as well as the cost associated therewith that needs to be expended in the course of effecting such removal and replacement of a worn grinding roll. Obviously, therefore, if one were able to reduce the frequency with which grinding rolls become sufficiently worn as to require replacement, cost savings could be realized in terms of the time and effort required to be expended to effect such replacement.

A need has, thus, been shown to exist in the prior art for a new and improved material, which is characterized by its highly abrasive resistant qualities. In addition, a need has been evidenced for such a highly abrasive resistant material which, at a minimum, would be suitable for employment as the exterior, i.e., wear, surface of a grinding roll and which would in turn enable a grinding roll to be provided that would be characterized by the fact that the grinding roll possesses a significantly longer operating life than that commonly found to be obtainable from a newly manufactured grinding roll that has been manufactured in accordance with heretofore known prior art materials. To this end, such a highly abrasive resistant material should be capable of being cast. Moreover, there has been evidenced a need for such a highly abrasive resistant material which would be suitable for employment for purposes of resurfacing a worn grinding roll wherein the highly abrasive resistant material would, at a minimum, form the exterior, i.e., wear, surface of the grinding roll. Such a highly abrasive resistant material should be suitable for employment for resurfacing a worn grinding roll notwithstanding the nature of the material which had originally been utilized as the exterior, i.e., wear, surface of the grinding roll. Furthermore, such a highly abrasive resistant material should be capable of being applied to the exterior, i.e., wear, surface of either a new grinding roll or a worn grinding roll by the technique of bulk welding. As such, such a highly abrasive resistant material should be susceptible to be pelletized whereby to ensure the uniformity and nonsegregation thereof when the application thereof is by the technique of bulk welding.

It is, therefore, an object of the present invention to provide a new and improved material which is characterized by its highly abrasive resistant qualities.

It is another object of the present invention to provide such a highly abrasive resistant material that is capable of being cast.

It is still another object of the present invention to provide such a highly abrasive resistant material which is particularly suited for use to form the exterior, i.e., wear, surface of a grinding roll that is designed to be employed in a bowl mill.

A further object of the present invention is to provide such a highly abrasive resistant material which is capable of being applied by the technique of bulk welding to a new grinding roll to form the exterior, i.e., wear, surface thereof.

A still further object of the present invention is to provide such a highly abrasive resistant material which is capable of being utilized to resurface the exterior, i.e., wear, surface of a worn grinding roll notwithstanding the nature of the material of which the exterior of the grinding roll had originally been formed.

Yet another object of the present invention is to provide such a highly abrasive resistant material which is capable of being pelletized for purposes of being applied by means of the technique of bulk welding to a grinding roll to form the exterior, i.e., wear, surface thereof.

Yet still another object of the present invention is to provide such a highly abrasive resistant material which is relatively inexpensive to provide, is easy to employ and is characterized by its relatively long wear life as compared to the wear life of the prior art material which has heretodate been available for use for similar purposes.

SUMMARY OF THE INVENTION

In accordance with one aspect of the present invention there is provided a highly abrasive resistant alloy which is particularly suited for use for purposes of forming the exterior, i.e., wear, surface of a grinding, i.e., pulverizer, roll of the type that is designed to be used in a bowl mill to effect the grinding, i.e., pulverization, of material such as coal therewithin. The subject highly abrasive resistant alloy embodies, by weight percentages, the following composition: 4.0–6.0% Carbon; 3.0–14.0% Manganese; 1.0–2.5% Silicon; 15.0–30.0% Chromium; and 4.0–6.0% Molybdenum, with 0.5–2.0% Boron being added thereto and with the balance being essentially iron.

In accordance with another aspect of the present invention there is provided a highly abrasive resistant alloy which in the as-cast state has, by weight percentages, the following composition: 4.0–6.0% Carbon; 3.0–14.0% Manganese; 1.0–2.5% Silicon; 15.0–30.0% Chromium; and 4.0–6.0% Molybdenum, with 0.5–2.0% Boron being added thereto and with the balance being essentially iron.

In accordance with yet another aspect of the present invention there is provided a grinding roll of the type that is designed to be employed in a bowl mill to effect the grinding of material therewith and which embodies at least an exterior, i.e., wear, surface that is formed of a highly abrasive resistant alloy having, by weight percentages, the following composition: 4.0–6.0% Carbon; 3.0–14.0% Manganese; 1.0–2.5% Silicon; 15.0–30.0% Chromium; and 4.0–6.0% Molybdenum, with 0.52.0–2.0% Boron being added thereto and with the balance being essentially iron.

In accordance with still another aspect of the present invention there is provided a method of applying hardfacing to a grinding roll of the type that is designed to be employed in a bowl mill to effect the grinding of material therewithin. The subject method includes the steps of providing in powder form a highly abrasive resistant alloy; adding a binder such as a silicate to the highly abrasive resistant alloy; mixing the silicate binder with the highly abrasive resistant alloy to form pellets each having a homogeneous consistency; drying the pellets to set the silicate binder; and forming a hardfacing having, by weight percentages, a composition of 4.0–6.0% Carbon; 3.0–14.0% Manganese; 1.0–2.5% Silicon; 15.0–30.0% Chromium; and 4.0–6.0% Molybdenum; with 0.5–2.0% Boron being added thereto and with the balance being essentially iron on a grinding roll by applying through the technique of bulk welding the pelletized highly abrasive resistant alloy to the grinding roll.

DESCRIPTION OF THE PREFERRED EMBODIMENT

Figure 1:
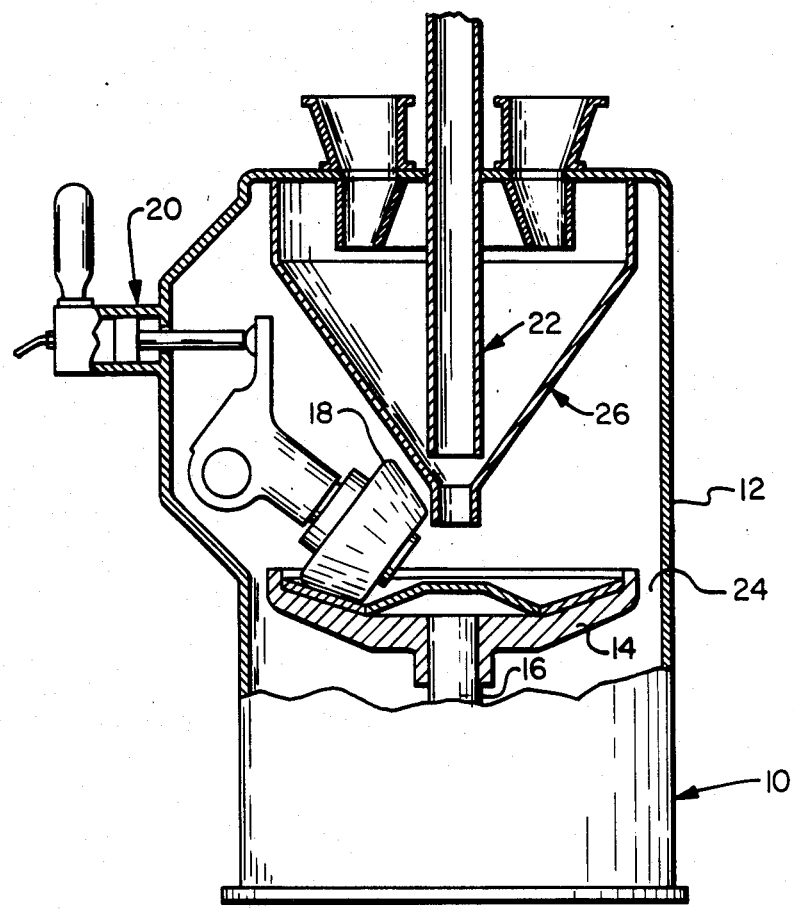
FIG. 1 is a side elevational view partly in section and with some parts broken away of a bowl mill embodying grinding rolls having at least the exterior, i.e., wear, surface thereof formed of the highly abrasive resistant alloy of the present invention.

Referring now to the drawing, and more particularly to FIG. 1 thereof, there is depicted therein a bowl mill, generally designated by reference numeral 10. Inasmuch as the nature of the construction and the mode of operation of bowl mills per se are well known to those skilled in the art, it is not deemed necessary, therefore, to set forth herein a detailed description of the bowl mill 10 illustrated in FIG. 1. Rather, it is deemed sufficient for purposes of obtaining an understanding of a bowl mill 10, which is capable of being equipped with grinding rolls that each have at least the exterior, i.e., wear, surface thereof formed of the highly abrasive resistant alloy of the present invention, that there be presented herein merely a generalized description of the nature of the construction and the mode of operation of the components of the bowl mill 10. For a more detailed description of the nature of the construction and the mode of operation of the components of the bowl mill 10, which are not described in detail herein, one may have reference to the prior art, e.g., U.S. Pat. No 3,465,971 which issued Sept. 9, 1966 to J. F. Dalenberg et al, and/or U.S. Pat. No. 4,002,299, which issued Jan. 11, 1977 to C. J. Skalka.

Referring further to FIG. 1 of the drawing, the bowl mill 10 as illustrated therein includes a substantially closed separator body 12. A grinding table 14 is mounted on a shaft 16, which in turn is operatively connected to a suitable drive mechanism (not shown) so as to be capable of being rotatably driven thereby. With the aforesaid components arranged within the separator body 12 in the manner depicted in FIG. 1 of the drawing, the grinding table 14 is designed to be driven in a clockwise direction.

Continuing with a description of the bowl mill 10, a plurality of grinding, i.e., pulverizer, rolls 18, preferably three in number in accord with conventional practice, are suitably supported within the interior of the separator body 12 so as to be spaced equidistantly one from another around the circumference of the latter. Note is made here of the fact that in the interest of maintaining clarity of illustration in the drawing only one grinding roll 18 has been depicted in FIG. 1.

With further regard to the grinding rolls 18, each of the latter as best understood with reference to FIG. 1 of the drawing is preferably supported on a suitable shaft (not shown) for rotation relative thereto. In addition, the grinding rolls 18 are also each suitably supported for movement relative to the upper surface, as viewed with reference to FIG. 1, of the grinding table 14. To this end, each of the grinding rolls 18 has a hydraulic means, generally designated in FIG. 1 by reference numeral 20, cooperatively associated therewith. Each of the hydraulic means 20 is operative to establish a hydraulic loading on the grinding roll 18 associated therewith whereby the latter roll 18 is made to exert the requisite degree of force on the coal that is disposed on the grinding table 14 for purposes of accomplishing the desired pulverization of this coal.

The material, e.g., coal, that is to be pulverized in the bowl mill 10 is fed thereto by means of any suitable conventional form of feed means. By way of exemplification in this regard, one such feed means that may be employed for this purpose is a belt feeder means (not shown). Upon being discharged from the feed means (not shown), the coal enters the bowl mill 10 by means of a coal supply means, generally designated by reference numeral 22, with which the separator body 12 is suitably provided. The coal supply means 22 is operative to cause the coal to flow onto the surface of the grinding table 14.

In accord with the mode of operation of bowl mills that embody the form of construction depicted in FIG. 1, a gas such as air is utilized to effect the conveyance of the coal from the grinding table 14 through the interior of the separator body 12 for discharge from the bowl mill 10. The air that is used in this regard enters the separator body 12 through a suitable opening (not shown) formed therein for this purpose. From the aforesaid opening (not shown) in the separator body 12 the air flows to a multiplicity of annular spaces 24 suitably formed between the circumference of the grinding table 14 and the inner wall surface of the separator body 12. The air upon exiting from the annular spaces 24 is deflected over the grinding table 14 by means of suitably positioned deflector means (not shown).

While the air flows along the path described above, the coal which is disposed on the surface of the grinding table 14 is being pulverized by the action of the grinding rolls 18. As the coal becomes pulverized, the particles are thrown outwardly by centrifugal force away from the center of the grinding table 14. Upon reaching the region of the circumference of the grinding table 14, the coal particles are picked up by the air exiting from the annular spaces 24 and are carried along therewith. The combined flow of air and coal particles is thereafter captured by the deflector means (not shown). The effect of this is to cause the combined flow of this air and coal particles to be deflected over the grinding table 14. This necessitates a change in direction in the path of flow of this combined stream of air and coal particles. In the course of effecting this change of direction, the heaviest coal particles, because they have more inertia, become separated from the airstream, and fall back onto the surface of the grinding table 14 whereupon they undergo further pulverization. The lighter coal particles, on the other hand, because they have less inertia continue to be carried along in the airstream.

After leaving the influence of the aforesaid deflector means (not shown), the combined stream of air and coal particles that remain flows to the classifier 26. The classifier 26 in accord with conventional practice and in a manner which is well-known to those in this art, operates to effect a further sorting of the coal particles that remain in the airstream. Namely, those particles of pulverized coal, which are of the desired particle size, pass through the classifier 26 and along with the air are discharged therefrom and thereby from the bowl mill 10. On the other hand, those coal particles, which in size are larger than desired, are returned to the surface of the grinding table 14 whereupon they undergo further pulverization. Thereafter, these coal particles are subject to a repeat of the process described above.

With further regard to the matter of the pulverizing action to which the coal disposed on the upper surface of the grinding table 14 is subjected by the grinding rolls 18, the amount of force that must be exerted on the latter in order to effect the desired degree of pulverization of the coal will vary depending on a number of factors. For example, one important consideration in this regard is the nature of the coal itself. That is, the amount of force required to pulverize the coal will be a function of the grindability of the coal to be pulverized, i.e., the grinding characteristics of the latter. Another important factor in determining the amount of force that the grinding rolls 18 must exert to accomplish the desired degree of pulverization of the coal is the depth to which the coal is disposed on the grinding table 14, which in turn is a function of the output rate at which the bowl mill 10 is being operated.

Figure 2:
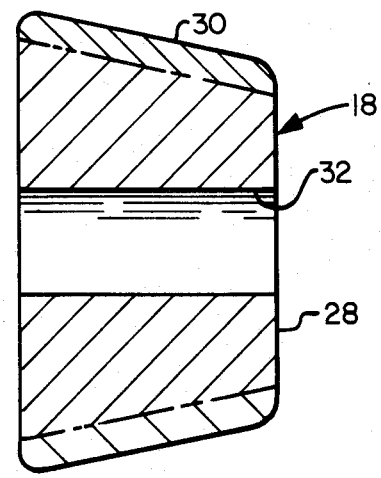
FIG. 2 is a sectional view on an enlarged scale of a grinding roll having the exterior, i.e., wear, surface thereof formed of the highly abrasive resistant alloy of the present invention.

For purposes of setting forth a detailed description of the highly abrasive resistant alloy to which the present invention is directed, reference will be had in particular to FIG. 2 of the drawing. Note is made here of the fact that FIG. 2 is intended simply to provide a general illustration of the nature of the construction which a grinding, i.e., pulverizer, roll 18 often embodies. Referring to FIG. 2 it will be readily apparent therefrom that the grinding roll 18 often consists of a main body portion, generally designated by reference numeral 28, that embodies the overall configuration of a roll, and a layered external surface 30 formed of a different material, e.g., the highly abrasive resistant alloy to which the present invention is directed, than that from which the body portion 28 is formed. To this end, the body portion 28 is preferably made of a relatively soft, easily machinable material such as ductile iron, while the external surface 30 is made of a relatively hard material which has good wear-resistant qualities, i.e., exhibits good abrasion-resistant characteristics. Further, as best understood with reference to FIG. 2, the body portion 28 has a through passage 32 formed through substantially the center thereof. The through passage 32 is suitably dimensioned so as to be capable of receiving therewithin in assembled relation thereto the shaft (not shown) to which reference has been previously been made hereinbefore, and on which the grinding roll 18 is suitably supported so as to be capable of functioning in the manner described above and shown in FIG. 1.

In essence, the reason for fabricating the grinding roll 18 from two dissimilar materials is to give equal recognition to first the fact that there is a need to provide the body portion 28 with the through passage 32 and secondly to the fact that the external surface 30 is subjected to a hard abrasive action in the course of effecting the pulverization of coal. The result, therefore, is that on the one hand it is desirable that the body portion 28 be made of a relatively soft, easily machinable material so as to facilitate the formation therein of the through passage 32. In contradistinction to this, there is a need for at least the external portion, i.e., that emcompassed by the external surface 30, to be made of a relatively hard material characterized by its capability to resist wear, and in particular the wear caused by abrasive action.

With the preceding discussion serving as a proper background for an understanding of the invention, in accordance with the present invention, there is provided an alloy, which embodies highly abrasive resistant qualities and which is particularly suited to be employed for purposes of forming therefrom the exterior, i.e., wear, surface 30 of the grinding roll 18. Moreover, the alloy of the present invention is further characterized in that it is capable of being cast, it is capable of being utilized to hardface a new grinding roll 18, it is capable of being utilized to resurface a worn grinding roll 18 notwithstanding the nature of the material which had originally been utilized to form the exterior surface 30 of the grinding roll 18, it is capable of being applied by the technique of bulk welding to form the exterior surface 30 of the grinding roll 18, and for purposes of being applied by the technique of bulk welding it is capable of being pelletized to form pellets thereof having essentially a homogeneous consistency.

Typically, the alloy of the present invention has, by weight percentages, the following composition: 4.0–6.0% Carbon; 3.0–14.0 Manganese; 1.0–2.5% Silicon; 15.0–30.0% Chromium; and 4.0–6.0% Molybdenum; with 0.5–2.0% Boron being added thereto, the balance being essentially iron. From the standpoint of wear resistancy, the critical factor is the amount of Carbon that the alloy contains. Though Carbon gives the alloy its wear resistancy, the higher the Carbon content the more brittle the alloy becomes. On the other hand, Chromium has been found when in the range of 15–30% to have little effect on wear resistancy. Yet because of its relatively high cost, it is desirable to minimize the use of chromium. By way of exemplification, the material known as Stoody 103, which is available from The Stoody Company of California, is reported to contain, by weight percentages, 4.0% Carbon and 27–28% Chromium, but no Molybdenum or Boron, except perhaps in barely discernible quantities.

On the other hand, it has been found possible in the case of the alloy of the present invention to increase the amount of Carbon that the latter contains as compared, for example, with the amount of Carbon to be found contained in the material known as Stoody 103. Yet, while increasing the Carbon content of the alloy of the present invention, it has also been found to be possible to maintain a relatively high content of Chromium, e.g., 15.0–30.0% therewith. For reasons that are not yet fully understood, the increase in the Carbon content while maintaining a relatively high level of Chromium has been made possible by the inclusion of Molybdenum and Boron in the composition of the alloy to which the present invention is directed. Heretofore, in the prior art as evidenced, for instance, by the material known as Stoody 103, the so-called "high chromium" alloys, which have been intended for employment in applications wherein wear resistance has been important, have not contained either Molybednum or Boron, except perhaps in barely discernible quantities. As noted previously herein, the material known as Stoody 103 is alleged to possess wear-resistant qualities, which render it one and half to two times more wear resistant than the material which has been referred to herein as ordinary Nihard. With this as base of reference, the alloy to which the present invention is directed, based on test results, is predicted to have twice the wear life of that of a prior art standard hardfacing material such as the material known as Stoody 103.

Although the alloy of the present invention is capable of being cast, in accordance with the preferred method of employment of the alloy of the present invention, the latter is preferably applied to a grinding roll 18 through the technique of bulk welding. The technique of bulk welding represents one technique for hardfacing a piece of equipment such as a grinding roll 18. The technique of bulk welding utilizes a wire, flux and a bulk metal powder in a submerged arc welding process. The bulk metal powder is fed at a controlled rate onto the base metal, the flux is piled on top of the bulk metal powder, and the wire is welded through the combination melting of the bulk metal powder and flux. The bulk metal powder may alloy the weld or just increase the deposition rate.

In order to avoid a faulty weld, it is important when employing the technique of bulk welding to assure the presence of a uniform, non-segregative bulk metal powder that would yield a consistent alloy content in the weld. In hardfacing, the Carbon content is often a critical constituent and is easily obtained using graphite. However, graphite is very fine and light, and tends to float on top of the other powders, which would cause an inconsistent alloy. Also, the graphite being fine, tends to plug the feeding device because of a bridging action on the part of the graphite. On the other hand, by pelletizing the powders, all of the constituents are combined into pellets homogeneously. The pelletizing process requires the addition of a binder such as a silicate, mixing to pelletize, and baking to set the binder. This process yields a uniform screen size powder with no fines, and each pellet has essentially the same composition. In addition, the pelletizing process also yields a greater flexibility in alloy composition by allowing different formulations to be developed with a homogeneous powder.

Accordingly, it should now be readily apparent from the preceding that in accordance with the present invention there is provided an alloy characterized by its highly abrasive resistant qualities which is particularly suited for employment for purposes of forming therefrom the exterior, i.e., wear, surface of a grinding roll, which enables the latter to thereby embody many advantageous features. First, the grinding roll provided with a wear surface formed of the alloy of the present invention embodies a body portion that comprises most of the structure of the grinding roll. This body portion is capable of being made from a material that is relatively easy to work thereby enabling economies of manufacture to be realized from the use of this material for this purpose. Secondly, the grinding roll embodies an external surface formed of the alloy of the present invention. Therefore, the grinding roll is capable of performing its intended function of accomplishing the pulverization of material such as coal in a more efficient and effective manner than that which has been possible when prior art materials have been employed to form the external surface of a grinding roll. Thirdly, the grinding roll provided with a wear surface formed of the alloy of the present invention is advantageously characterized in the fact that as a new grinding roll it is capable of providing a longer operating life before it becomes unusable by virtue of having become worn than can a new grinding roll that has had the exterior thereof formed of a prior art hardfacing material. This longer operating life for the new grinding roll provided with a wear surface formed of the alloy of the present invention is obtainable by virtue of the fact that the wear life of the alloy of the present invention is predicted to be approximately twice the wear life of prior art standard hardfacing materials. Fourthly, the grinding roll provided with a wear surface formed of the alloy of the present invention is advantageously characterized in the fact that as a resurfaced worn grinding roll it is capable of providing a longer operating life before it becomes unusable by virtue of having become worn than can a resurfaced worn grinding roll that has had the exterior surface thereof resurfaced with a prior art hardfacing material. This longer operating life for the resurfaced worn grinding roll provided with a wear surface formed of the alloy of the present invention is obtainable by virtue of the fact that the wear life of the alloy of the present invention is predicted to be approximately twice the wear life of prior art standard hardfacing materials.

Thus, in accordance with the present invention there has been provided a new and improved material which is characterized by its highly abrasive resistant qualities. Moreover, the highly abrasive resistant material of the present invention is capable of being cast. In addition, in accord with the present invention a highly abrasive resistant material is provided which is particularly suited for use to form the exterior, i.e., wear, surface of a grinding roll that is designed to be employed in a bowl mill. Further, the highly abrasive resistant material of the present invention is capable of being applied by the technique of bulk welding to a new grinding roll to form the exterior, i.e., wear, surface thereof. Additionally, in accordance with the present invention a highly abrasive resistant material is provided which is capable of being utilized to resurface the exterior, i.e., wear, surface of a worn grinding roll notwithstanding the nature of the material of which the exterior of the grinding roll had originally been formed. Also, the highly abrasive resistant material of the present invention is capable of being pelletized for purposes of being applied by means of the technique of bulk welding to a grinding roll to form the exterior, i.e., wear, surface thereof. Furthermore, in accord with the present invention a highly abrasive resistant material is provided which is relatively inexpensive to provide, is easy to employ, and is characterized by its relatively long wear life as compared to the wear life of the prior art materials which have heretodate been available for use for similar purposes.

While only one embodiment of my invention has been shown, it will be appreciated that modifications thereof, some of which have been alluded to hereinabove, may still be readily made thereto by those skilled in the art. I, therefore, intend by the appended claims to cover the modifications alluded to herein as well as all the other modifications which fall within the true spirit and scope of my invention.

What is claimed is:

1. In a pulverizer roll for a bowl mill including a body portion formed of a relatively soft, easily machinable material, the improvement comprising a highly abrasive surface formed on said body portion of an alloy having a compositon, by weight percentages, of 4.0–6.0% Carbon; 3.0–14.0% Manganese; 1.0–2.5% Silicon; 15.0–30.0% Chromium; 4.0–6.0% Molybdenum; and 0.5–2.0% Boron, the balance being essentially iron.

2. In a pulverizer roll as set forth in claim 1 wherein said relatively soft, easily machinable material is ductile iron.

3. In a pulverizer roll as set forth in claim 2 wherein said body portion has a through passage formed through substantially the center thereof.

* * * * *